(12) United States Patent
Schilling et al.

(10) Patent No.: US 8,206,101 B2
(45) Date of Patent: Jun. 26, 2012

(54) WINDWARD COOLED TURBINE NOZZLE

(75) Inventors: John Creighton Schilling, Sharonville, OH (US); Robert David Briggs, West Chester, OH (US); Ronald Eugene McRae, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 799 days.

(21) Appl. No.: 12/139,568

(22) Filed: Jun. 16, 2008

(65) Prior Publication Data

US 2009/0311090 A1 Dec. 17, 2009

(51) Int. Cl.
*F01D 25/14* (2006.01)
(52) U.S. Cl. ............... 415/210.1; 415/211.1; 415/213.1
(58) Field of Classification Search ............. 415/210.1, 415/211.2, 213.1
See application file for complete search history.

(56) References Cited

U.S. PATENT DOCUMENTS

| | | | |
|---|---|---|---|
| 3,945,758 A | 3/1976 | Lee | |
| 4,187,054 A | 2/1980 | Landiis et al. | |
| 4,353,679 A | 10/1982 | Hauser | |
| 4,702,670 A | 10/1987 | Winter | |
| 4,893,987 A | 1/1990 | Lee et al. | |
| 4,902,198 A | 2/1990 | North | |
| 5,131,814 A | 7/1992 | Przytulski et al. | |
| 5,197,852 A | 3/1993 | Walker et al. | |
| 5,211,536 A | 5/1993 | Ackerman et al. | |
| 5,224,822 A | 7/1993 | Lenahan et al. | |
| 5,252,026 A * | 10/1993 | Shepherd | 415/115 |
| 5,344,283 A | 9/1994 | Magowan et al. | |
| 5,358,374 A | 10/1994 | Correia et al. | |
| 5,470,198 A | 11/1995 | Harrogate et al. | |
| 5,609,466 A | 3/1997 | North et al. | |
| 5,636,439 A | 6/1997 | Cunha et al. | |
| 6,065,928 A | 5/2000 | Rieck et al. | |
| 6,077,035 A | 6/2000 | Walters et al. | |
| 6,227,789 B1 | 5/2001 | Williamson | |
| 6,354,797 B1 | 3/2002 | Heyward et al. | |
| 6,398,488 B1 * | 6/2002 | Solda et al. | 415/115 |
| 6,481,959 B1 | 11/2002 | Morris et al. | |
| 7,121,793 B2 * | 10/2006 | Correia | 415/191 |
| 7,140,835 B2 * | 11/2006 | Lee et al. | 415/115 |
| 7,185,433 B2 * | 3/2007 | Miller et al. | 29/889.22 |
| 2003/0161726 A1 | 8/2003 | Lu | |
| 2004/0109754 A1 | 6/2004 | Townes et al. | |
| 2006/0073011 A1 | 4/2006 | Lee et al. | |
| 2006/0127212 A1 | 6/2006 | Durocher et al. | |

* cited by examiner

*Primary Examiner* — George Fourson, III
(74) *Attorney, Agent, or Firm* — David J. Clement; Trego, Hines & Ladenheim, PLLC

(57) ABSTRACT

A turbine nozzle includes a hollow vane mounted between inner and outer bands. The inner band includes a mounting flange between forward and aft lips. An aft pocket is found in the inner band between the flange and aft lip. And, an impingement bore extends through the flange into the windward half of the pocket and is directed aft toward the opposite leeward half of the pocket for co-rotation with purge flow during operation.

20 Claims, 4 Drawing Sheets

WINDWARD COOLED TURBINE NOZZLE

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases. Energy is extracted from the gases in a high pressure turbine (HPT) which powers the compressor. And, additional energy is extracted from the gases in a low pressure turbine (LPT) which powers a fan in a typical turbofan aircraft engine application.

The HPT includes a first stage turbine nozzle that directly receives the hot combustion gases from the combustor. The nozzle includes a row of hollow stator vanes mounted in inner and outer bands defining corresponding flow passages therebetween for directing the combustion gases into the following row of first stage turbine rotor blades.

In one embodiment, the nozzle includes a mounting flange extending radially inwardly from the inner band which supports the entire nozzle from an annular frame. The mounting flange defines a cavity or plenum on its forward side through which cooling air may be fed into the hollow nozzle vanes. The mounting flange also defines an aft cavity or plenum with the rotary disk of the first stage turbine blades, and through which purge air is channeled during operation.

The hollow nozzle vanes have suitable cooling circuits therein through which a portion of compressor discharge air is channeled for cooling the vanes and bands during operation. The cooling circuits for the first stage turbine nozzle may have various configurations for different engine applications and operating cycles, and are designed for maximizing nozzle life.

Commercial use of one type of aircraft turbofan engine has uncovered elevated operating temperatures in the inner band of the first stage turbine nozzle causing undesirable oxidation thereof in fewer than desired operating cycles. In particular, the aft inner band above the aft purge cavity has shown thermal distress that requires early replacement of the turbine nozzle at corresponding expense and down-time of the aircraft.

Accordingly, it is desired to modify the cooling configuration of this conventional design to improve its durability and life while minimizing the cooling air requirements therefor.

BRIEF DESCRIPTION OF THE INVENTION

A turbine nozzle includes a hollow vane mounted between inner and outer bands. The inner band includes a mounting flange between forward and aft lips. An aft pocket is disposed in the inner band between the flange and aft lip. And, an impingement bore extends through the flange into the windward half of the pocket and is directed aft toward the opposite leeward half of the pocket for co-rotation with purge flow during operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
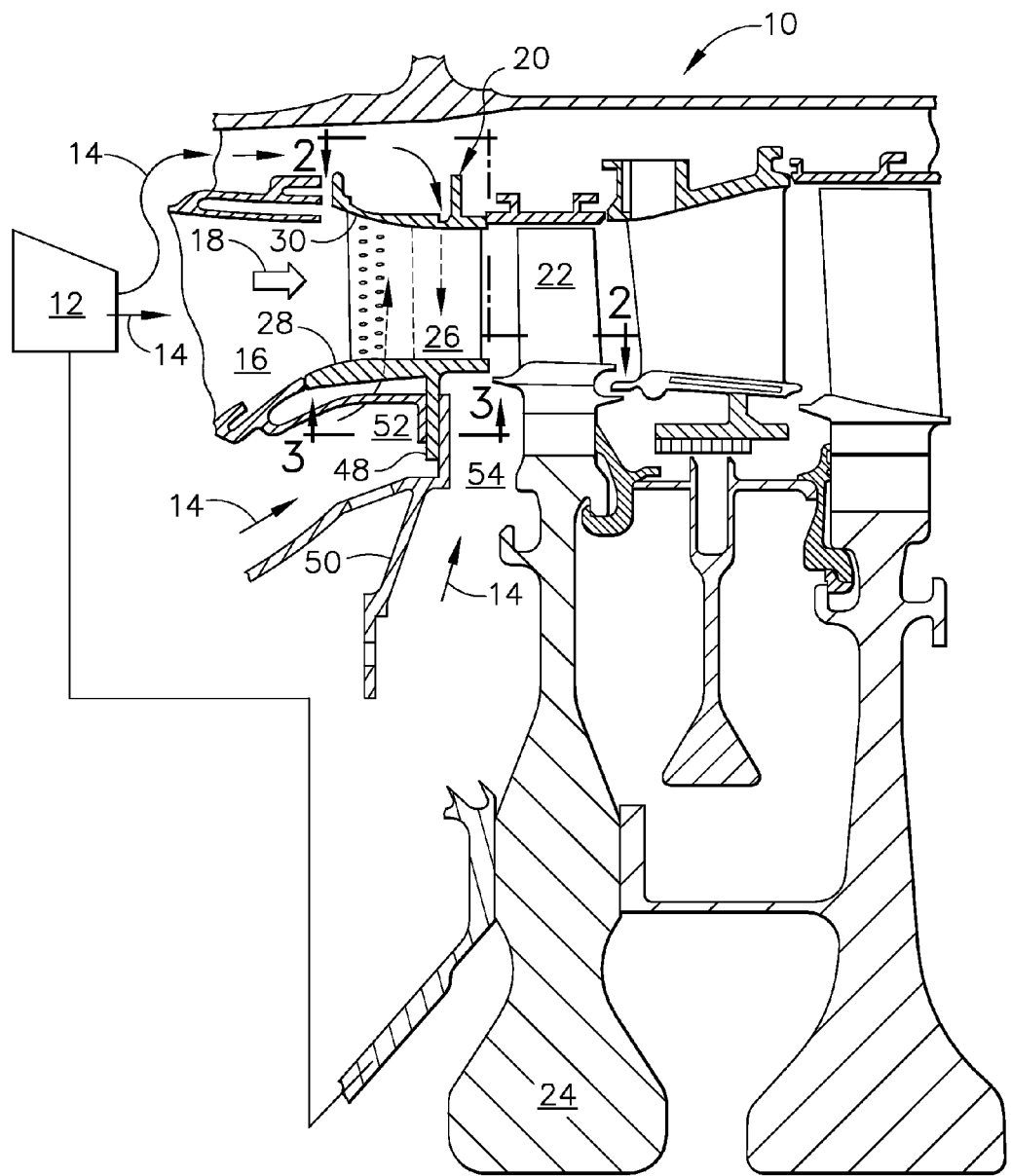
FIG. 1 is a partly sectional schematic view of a portion of a turbofan gas turbine engine including a first stage turbine nozzle therein.

Illustrated schematically in FIG. 1 is a portion of an aircraft turbofan gas turbine engine 10 which is axisymmetrical about a longitudinal or axial centerline axis. The engine 10 includes a multistage axial compressor 12 which pressurizes air 14 during operation. The pressurized air is mixed with fuel in an annular combustor 16, shown in aft part, for generating hot combustion gases 18 during operation.

The engine 10 includes a two-stage HPT having a first stage turbine nozzle 20 suitably mounted at the outlet of the combustor 16 for directly receiving the hot combustion gases 18 therefrom during operation. Directly following the nozzle 20 is a row of first stage turbine rotor blades 22 extending radially outwardly from a supporting rotor disk 24.

Following the first stage blades 22 are a second stage turbine nozzle and cooperating second stage rotor blades which cooperate to power the rotor of the compressor 12 through a drive shaft during operation.

A LPT follows the HPT to power an upstream fan (not shown) in a typical turbofan aircraft engine application.

Figure 2:
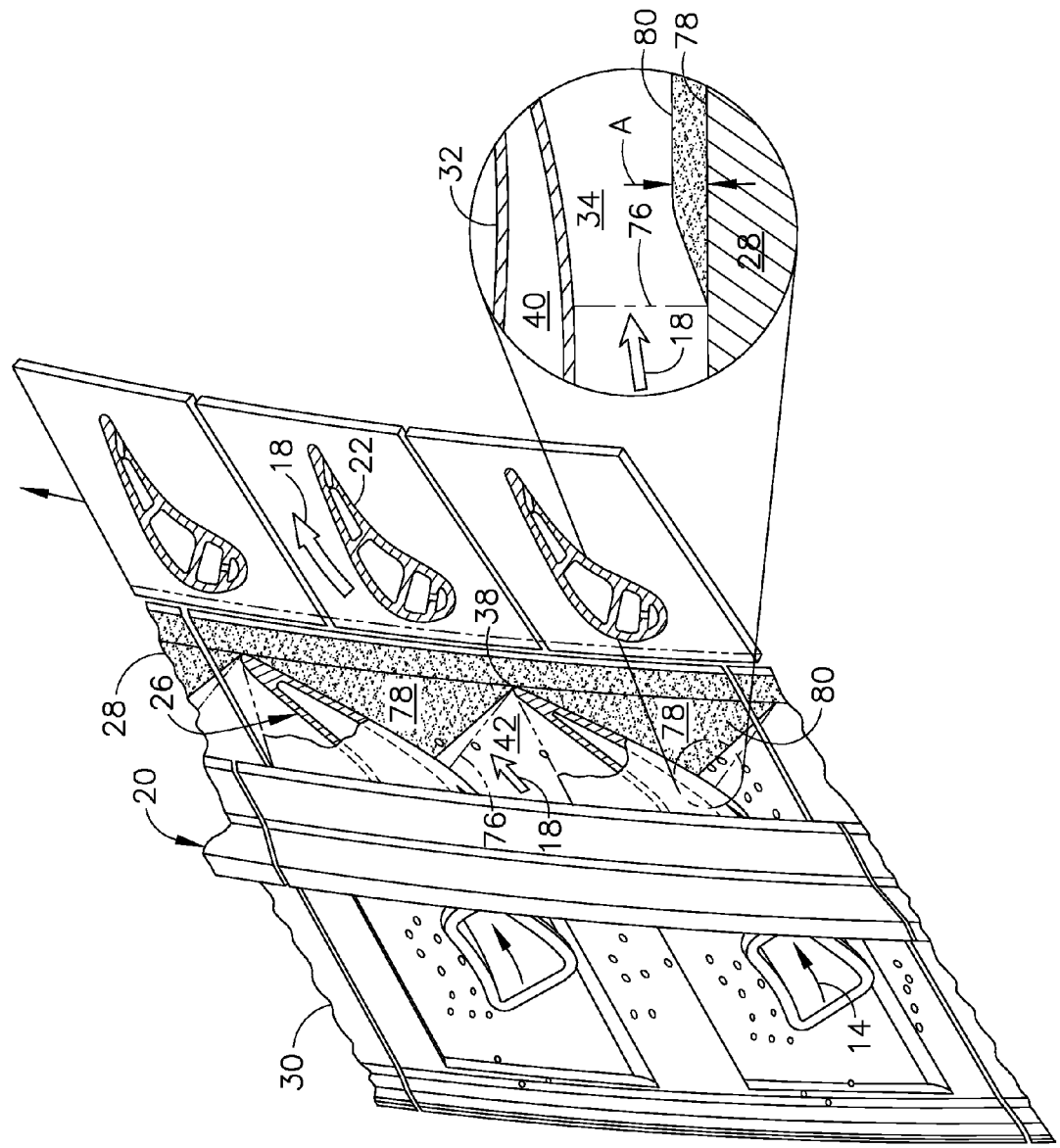
FIG. 2 is a top planiform view of the turbine nozzle and cooperating first stage turbine rotor blades illustrated in FIG. 1 and taken along line 2-2.
Figures 3, 4:
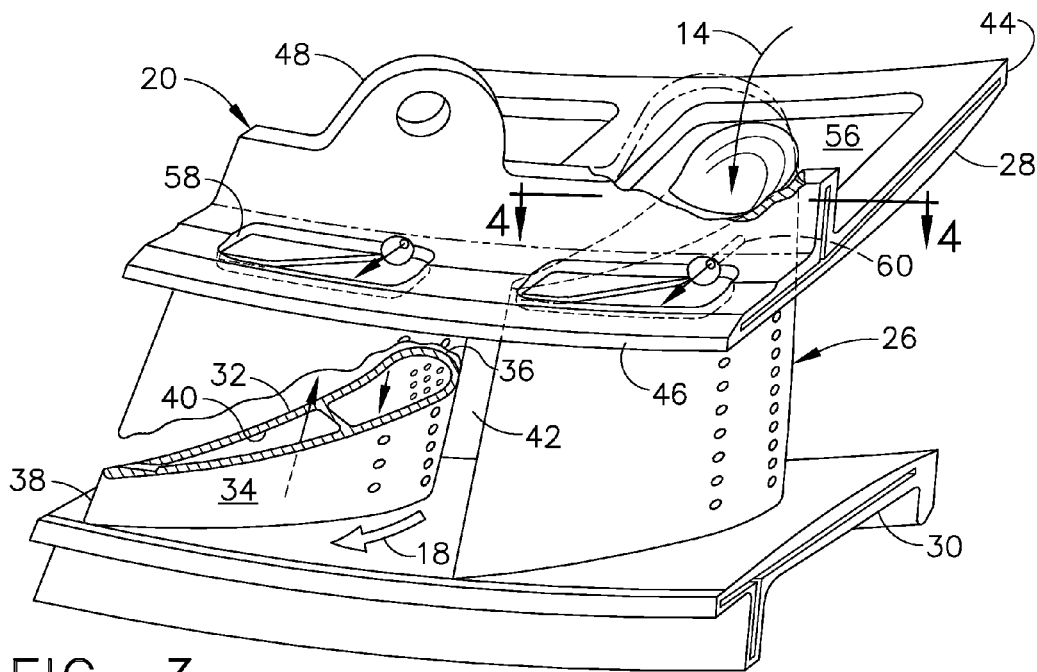
FIG. 3 is a underside view of an exemplary doublet portion of the annular turbine nozzle illustrated in FIG. 1 and taken generally along line 3-3.
FIG. 4 is an enlarged underside view of a portion of the inner band illustrated in FIG. 3 and taken generally along line 4-4.

FIG. 2 is a top view of a portion of the nozzle 20 cooperating with the downstream rotor blades 22, and FIG. 3 is a generally underside or bottom view of a corresponding portion of the nozzle 20.

The turbine nozzle is axisymmetrical about the axial centerline axis of the engine and includes a row of hollow stator vanes 26 extending radially outwardly between radially inner and outer bands 28,30. The bands are typically segmented circumferentially and integrally join opposite ends of a pair of the vanes 26 in a corresponding nozzle doublet.

In this way, two vanes are integrally joined at opposite ends to corresponding inner and outer band segments, and the corresponding complement of nozzle doublets are arranged in a full row having suitable spline seals between the axial splitlines thereof.

As best shown in FIG. 3, each vane 26 includes a generally concave pressure side 32, and a circumferentially opposite, generally convex suction side 34. The two sides extends radially in span between the two bands and are integrally joined thereto, and also extend axially in chord between opposite leading and trailing edges 36,38.

Each vane is hollow and includes a suitable internal cooling circuit 40 for channeling therethrough a portion of the compressor discharge pressure air 14 during operation. In the exemplary embodiment illustrated in FIGS. 1 and 2, the cooling circuit includes a midchord partition or septum dividing each vane into forward and aft cooling channels. The forward channel is fed with cooling air through an inlet in the inner band, and the aft channel is fed by cooling air through a corresponding outlet in the outer band.

As shown in FIGS. 2 and 3, adjacent vanes 26 in the nozzle extend radially between the two bands 28,30 to define corresponding flow passages 42 through which the hot combustion gases flow in the downstream aft direction during operation.

The inboard sides of the bands 28,30 and the outer surfaces of the vanes 26 define the corresponding flow passages 42 which directly bound the hot combustion gases during operation. The individual vanes 26 are internally cooled by the pressurized air 14 channeled through the cooling circuits 40 during operation. And the outboard sides of the two nozzle bands are correspondingly cooled by portions of the pressurized air 14 flowing thereover during operation.

In particular, the inner band 28 illustrated in FIG. 3 includes a forward lip 44 located at the upstream side of the vanes at the leading edges thereof, and an axially opposite aft lip 46 located at the downstream side of the vanes at the trailing edges.

A mounting flange 48 is disposed between the opposite forward and aft lips 44,46, and is suitably spaced from the aft lip to cantilever the aft portion of the inner band adjacent to the first stage turbine blades.

As shown in FIG. 1, the mounting flange 48 is fixedly joined by fasteners to a supporting annular frame 50 to support the entire turbine nozzle between the combustor and turbine blades. The forward cantilever of the inner band 28 surrounds a forward plenum or cavity 52 which receives a portion of the compressor discharge air 14 that is then channeled through the forward inlet in the inner band into the forward cooling passage of each vane.

The aft cantilever of the inner band is disposed closely adjacent to the turbine blades and supporting rotor disk, and surrounds an aft annular plenum or cavity 54 through which is channeled a portion of the compressor discharge air 14 for purging the aft cavity during operation.

FIG. 3 illustrates the underside of the inner band 28 and its forward and aft cantilevered portions. In particular, the forward cantilever includes a corresponding forward pocket 56 under each of the vanes and includes a corresponding inlet for channeling the cooling air into the forward passage of each vane.

The aft cantilever of the inner band includes a corresponding aft pocket 58 recessed into the radially inner outboard side of the inner band under the aft end of each vane. The aft pocket 58 begins closely adjacent to the mounting flange 48 and axially terminates near the aft lip 46.

The aft pocket 58 is generally rectangular and begins closely adjacent to the corresponding axial splitline of the nozzle doublet and circumferentially terminates near the middle of the doublet leaving a surrounding thicker land therearound.

In this way, each vane in each nozzle doublet includes the forward pocket 56 under the forward end of the vane and the aft pocket 58 under the aft end of the vane, which pockets reduce thermal mass and weight of the inner band in accordance with conventional practice.

More specifically, the turbine nozzle 20 as described above is conventional in configuration and operation and has been used in commercial public use in the USA for more than a year. The nozzle is designed for efficient performance in powering the engine, yet experience during operation has uncovered local thermal distress of the aft cantilever of the inner band 28. This thermal distress leads to a reduction in the desired life of the nozzle, and disclosed hereinbelow are localized modifications thereof which can substantially increase the useful life of the nozzle as so modified up to about triple the original life.

More specifically, each of the aft pockets 58 is modified to include a straight impingement bore 60 extending through the base of the mounting flange 48 for diverting some of the pressurized cooling air 14 from the forward cavity 52 illustrated in FIG. 1 to the underside of the inner band at a specific location inside the aft pocket for localized cooling thereof against the localized heating experienced during operation that originally led to the local thermal distress. Diverting the cooling air through the corresponding impingement bores 60 correspondingly reduces overall efficiency of the engine, yet is more than offset by the substantial increase in life of the turbine nozzle.

A representative one of the row of aft pockets 58 is illustrated in more detail in FIG. 4. Each aft pocket 58 is a local recess or depression in the outboard or underside surface of the inner band 28 between the mounting flange 48 and the aft lip 46. The aft pocket 58 includes a forward wall 62 disposed closely adjacent to the mounting flange 48, and an axially opposite aft wall 64 disposed closely adjacent to the aft lip 46 for maintaining suitable thickness of that aft lip.

Each aft pocket 58 also includes a circumferentially upstream or windward portion or half 66, and a circumferentially opposite or downstream leeward portion or half 68 surrounded forward and aft by the corresponding end walls 62,64 and surrounded laterally by corresponding sidewalls along the surrounding lands of the inner band.

As initially shown in FIG. 2, the aerodynamic orientation of the vanes 26 and blades 22 causes the blades to rotate their supporting disk with the convex suction sides of the blades leading or preceding the concave pressure sides of the blades. Rotation of the first stage turbine disk correspondingly causes swirl rotation of the purge air 14 in the aft cavity 54 illustrated in FIG. 1.

Figure 5:
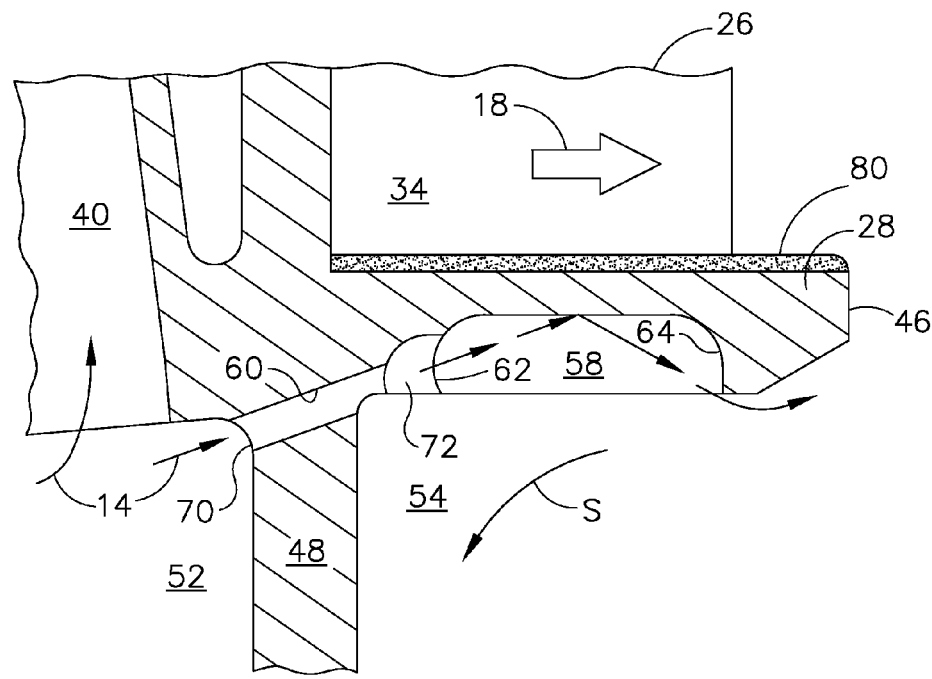
FIG. 5 is an inverted axial sectional view through the inner band and aft pocket illustrated in FIG. 4 and taken along line 5-5.
Figure 6:
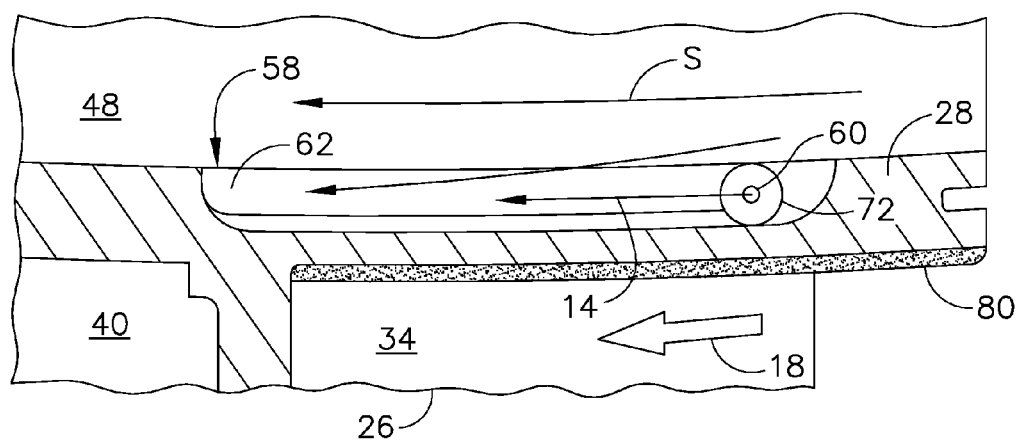
FIG. 6 is a circumferential sectional view through the inner band and aft pocket illustrated in FIG. 4 and taken along line 6-6.

This secondary swirl flow of the purge air 14 is identified by the flow direction arrow S illustrated in FIGS. 4, 5, and 6.

In FIG. 4 the rotor induced swirl flow S is from right to left, and first reaches the suction side 34 of each vane and then leaves each vane over its pressure side 32 in the circumferential direction.

Correspondingly, each of the aft pockets 58 has its windward portion 66 extending outwardly or obliquely from the corresponding vane suction side 34 and first receives the swirl flow S during operation. The remaining leeward half 68 of each aft pocket 58 extends circumferentially downstream toward the vane pressure side 32 and lastly receives the swirl air S first received by the windward half.

Accordingly, the corresponding impingement bores 60 illustrated in FIG. 4 are specifically introduced to extend solely into the windward halves 66 of each aft pocket, and are directed aft toward the aft walls 64 and obliquely toward the leeward halves 68 of the corresponding aft pockets 58.

In this way, the impingement air 14 discharged from the impingement bore 60 first enters the aft pocket 58 at its circumferentially upstream or windward side to reduce or eliminate local flow stagnation where the purge flow S initially flows over the pocket. Elimination or reduction of local flow stagnation correspondingly increases cooling effectiveness and thereby decreases local heat to reduce or eliminate the previously observed thermal distress.

The impingement bore 60 is best illustrated in FIG. 5 and includes an inlet 70 at the forward side of the base of the mounting flange 48 for receiving a portion of the cooling air 14 from the forward cavity 52. Each bore 60 also includes an opposite outlet 72 at the opposite aft or downstream side of the mounting flange 48 in the forward wall 62 of the aft pocket 58.

The bore 60 is straight and is inclined radially outwardly toward the aft lip 46 to firstly impinge the aft pocket near the middle of the windward half 66 before impinging the aft wall 64 of the aft lip 46. Since the inner band is locally thin at the aft pocket 58, direct impingement of the cooling air 14 inside the windward half 66 more effectively cools the inner band against the high heat flux of the combustion gases 18 flowing over the opposite inboard side of the band.

Since the aft pocket 58 illustrated in FIG. 4 is generally rectangular, its four walls or sides preferably join each other at corresponding arcuate corners for reducing localized stress during operation. And in particular, the forward wall 62 joins the bounding wall of the windward half 66 at an arcuate corner 74, and the bore outlet 72 adjoins that corner 74 to maximize the windward side introduction of the impingement air in the aft pocket. In this way, flow stagnation from the circumferentially upstream wall of the aft pocket may be substantially reduced or eliminated by the jet of impingement air entering the pocket.

The bore outlet 72 is preferably not located in the arcuate corner 74 itself to avoid locally increasing undesirable stress thereat.

FIG. 4 illustrates a typical configuration of the aft pocket 58 recessed in the underside of the inner band 28. The maximum recessed depth is found in the windward half 66, with a small ledge extending in the leeward half which decrease the depth of the recess. Correspondingly, the forward wall 62 is relatively short or small providing little room for the introduction of the impingement bore 60.

The impingement bore 60 preferably has a nominal diameter of about 30 mils (0.76 mm), and is inclined radially upwardly as illustrated in FIG. 5 with about a 20 degree impingement angle against the aft pocket. And in FIG. 4, the circumferential inclination angle of the impingement bore 60 is generally parallel with the sidewall of the windward half 66, and preferably diverges a few degrees therefrom in the axially aft direction.

In view of the short forward wall 62, the bore outlet 72 is preferably counterbored in that forward wall using conventional drilling processes, such as electrical discharge machining (EDM). The aft lip 46 of the inner band is relatively thin which permits unrestricted line-of-sight access for the EDM electrode at the shallow inclination angle through the forward wall 62 at the base of the mounting flange 48.

The counterbored outlet 72 preferably has a diverging bellmouth profile to locally diffuse the high velocity jet of impingement air and laterally spread the flow into the windward half 66 of the aft pocket as illustrated schematically in FIG. 4.

Each of the aft pockets 58 preferably includes a single impingement bore 60 preferentially located and preferentially inclined as described above to initially impingement cool the windward half 66 of the aft pocket and reduce or eliminate stagnation flow therein, with the impingement jet than proceeding aft to impinge the aft wall 64 as it is discharged under the aft lip 46 during operation. The impingement air diverges laterally or circumferentially during its flow along the windward half 66, and spreads aft toward the leeward half 68 as well.

Accordingly, the introduction of a single impingement bore 60 into the otherwise closed or blind aft pocket 58 enjoys substantial improvements in localized cooling of the inner band at the relatively small cost of the impingement air diverted through the mounting flange. The impingement air locally impingement cools the deepest part of the aft pocket where the inner band is relatively thin. The impingement air reduces or eliminates secondary flow stagnation within the aft pocket for improving cooling heat transfer effectiveness. And, the impingement air pressurizes the aft pocket providing an aerodynamic boundary for the secondary purge flow thereover during operation.

Accordingly, a substantial reduction in local temperature of the inner band may be realized for correspondingly increasing the useful life of the nozzle.

However, nozzle life may be further significantly improved with additional localized changes in the nozzle design.

More specifically, as shown in FIG. 2 each pair of vanes 26 defines the corresponding flow passage 42 between the bands which converges aft to a throat 76 of minimum flow area for the combustion gases. The throat extends radially along both vanes between the bounding inner and outer bands 28,30. And, the throat 76 extends circumferentially or laterally between the trailing edge of one vane 26 and perpendicular to the suction side 34 of the next vane located suitably upstream from the trailing edge 38 thereof.

The throat 76 is generally perpendicular to the flow direction of the combustion gases 18 being discharged therethrough and forms the upstream end of a triangular land 78 extending aft to the aft lip 46 of the inner band between the trailing edges of adjacent vanes.

This triangular land 78 is preferably covered with a thermal barrier coating (TBC) 80 aft from the throat 76 on the inboard side of the inner band radially behind the aft pockets 58 on the opposite outboard side of the inner band. The TBC 80 may have any conventional configuration and is typically a ceramic material that provides thermal insulation against the heat of the hot combustion gases.

The TBC 80 begins after the throat and extends over the triangular land 78 along the remaining length of the vane suction sides 34 to the trailing edges of the vanes and continues aft over the aft lip 46 of the inner band.

In this way, the TBC 80 locally cooperates with the enhanced cooling of the aft pockets 58 and substantially reduces the previously observed thermal distress in this region of the inner band, and collectively increase the useful life of the nozzle as indicated above.

Each of the flow passages 42 is preferably devoid of any thermal barrier coating except at the corresponding triangular lands 78 of the inner band. In particular, each flow passage is devoid of the TBC along the pressure sides 32 of the vanes 26 between the leading and trailing edges 36,38, and along the inboard surface of the outer bands 30, and along the inboard surfaces of the inner bands 28 upstream from the corresponding throat 76.

The TBC 80 is preferably introduced locally on the inboard side of the inner band 28 along the corresponding suction sides of the vanes 26 between the throat 76 and trailing edges 38 and terminates at the aft lip 46.

The nozzle throat 76 illustrated in FIG. 2 is a significant feature of the turbine nozzle that controls engine efficiency, and therefore has a precise magnitude for each engine application. The TBC 80 is illustrated in elevation or profile in FIG. 2 and has a substantially constant or nominal thickness A of about 5-9 mils (0.13-0.23 mm). In order to prevent the additional thickness of the TBC from adversely affecting performance of the nozzle throat 76, the TBC 80 preferably transitions from the triangular land 78 to the nozzle throat 76 with a featheredge tapering to zero thickness at the throat.

In other words, the TBC 80 may commence immediately at or near the nozzle throat 76 with a zero thickness and increases rapidly to its full nominal thickness immediately aft of the throat in a linear ramp for example.

FIG. 2 also illustrates that the throat bridges the trailing edge of one vane and the suction side of the next vane, being normal thereto, and the transition ramp correspondingly varies in axial length therebetween. For example, the transition ramp may extend about 40 mils (1.0 mm) aft from the throat 76 along the suction side of the next vane and decreases in axial length to the trailing edge of the next vane.

FIG. 2 illustrates the triangulated or sawtooth configuration of the TBC 80 protecting the nozzle outlet along the inboard side of the inner band. FIG. 4 illustrates the improved cooling configuration of the row of aft pockets 58 in the underside of the inner band opposite to the TBC.

FIGS. 5 and 6 illustrate the combined and cooperating configuration of the aft pockets 58 receiving impingement air from the corresponding impingement bores 60 on one side, and further protected by the localized introduction of the TBC 80 on the opposite side.

Individually, the introduction of the impingement bores 60 and the localized introduction of the TBC 80 correspondingly reduce thermal distress and therefore increase nozzle durability and life. And collectively, the cooperating features significantly decrease thermal distress and increase nozzle life at the small chargeable expense of cooling air diverted through the mounting flange.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   a row of vanes extending radially between inner and outer bands and having opposite pressure and suction sides defining corresponding flow passages converging between opposite leading and trailing edges;
   said inner band includes an inboard side bounding said flow passages, an opposite outboard side facing radially inwardly, a mounting flange disposed between opposite forward and aft lips, and a row of aft pockets recessed in said outboard side between said flange and aft lip; and
   corresponding impingement bores extending through said flange into each of said aft pockets and cooperating with isolated thermal barrier coating on the inboard side of said inner band behind said pockets.

2. A nozzle according to claim 1 wherein:
   said aft pockets include a forward wall along said flange, an aft wall along said aft lip, a windward half extending outwardly from said vane suction side, and an opposite leeward half; and
   said impingement bores extend into said windward halves, and are directed aft toward said aft walls and leeward halves of said pockets.

3. A nozzle according to claim 2 wherein each of said impingement bores comprises:
   an inlet at a forward side of said flange and an outlet at an opposite aft side of said flange in said pocket forward wall; and
   said bore is inclined radially outwardly toward said aft lip to impinge said pocket windward half before said aft lip.

4. A nozzle according to claim 3 wherein said bore outlet adjoins an arcuate corner of said pocket.

5. A nozzle according to claim 4 wherein said bore outlet is counterbored in said pocket forward wall.

6. A nozzle according to claim 5 wherein said counterbored outlet has a diverging bellmouth profile.

7. A nozzle according to claim 5 wherein each of said aft pockets includes a single impingement bore.

8. A nozzle according to claim 5 wherein:
   each of said flow passages converges to a throat of minimum flow area between said trailing edge of one vane and said suction side of an adjacent vane forming a triangular land extending aft to said aft lip; and
   said lands are covered with said thermal barrier coating aft from said throats behind said pockets.

9. A nozzle according to claim 8 wherein said flow passages are devoid of said thermal barrier coating except at said lands.

10. A nozzle according to claim 9 wherein said thermal barrier coating transitions from said lands to said throats with featheredges.

11. A turbine nozzle comprising:
    a hollow vane integrally joined to inner and outer bands and having opposite pressure and suction sides extending in span between said bands and in chord between opposite leading and trailing edges;
    said inner band including a forward lip at said leading edge, an aft lip at said trailing edge, a mounting flange spaced therebetween, and an aft pocket recessed between said aft lip and flange; and
    an impingement bore extending through said flange into a windward half of said pocket and directed aft toward an opposite leeward half of said pocket.

12. A nozzle according to claim 11 wherein:
    said impingement bore includes an inlet at a forward side of said flange and an outlet at an opposite aft side of said flange in a forward wall of said pocket; and
    said bore is directed aft toward said aft lip to impinge said pocket before said aft lip.

13. A nozzle according to claim 12 wherein said bore outlet adjoins an arcuate corner of said pocket.

14. A nozzle according to claim 12 wherein said bore outlet is counterbored in said forward wall of said pocket.

15. A nozzle according to claim 14 wherein said counterbored outlet has a diverging bellmouth profile.

16. A nozzle according to claim 12 wherein said aft pocket includes a single impingement bore.

17. A nozzle according to claim 12 further comprising:
    a pair of said vanes defining a flow passage between said bands converging aft to a throat of minimum flow area between said trailing edge of one vane and said suction side of the other vane forming a triangular land extending aft to said aft lip; and
    said land is covered with a thermal barrier coating aft from said throat and behind said aft pocket.

18. A nozzle according to claim 17 wherein said flow passage is devoid of said thermal barrier coating except at said land.

19. A nozzle according to claim 17 wherein said flow passage is devoid of said thermal barrier coating along said pressure sides of said vanes between said leading and trailing edges, and includes said thermal barrier coating on said inner band along said suction sides of said vanes between said throat and trailing edges.

20. A nozzle according to claim 17 wherein said thermal barrier coating transitions from said land to said throat with a featheredge.

* * * * *